United States Patent
Bieletzki (10) Patent No.: US 10,959,394 B2
(45) Date of Patent: Mar. 30, 2021

(54) METHOD AND DEVICE FOR DETERMINING PARAMETERS OF A RINSING PROCESS FOR A MILKING SYSTEM

(71) Applicant: GEA Farm Technologies GmbH, Bönen (DE)

(72) Inventor: Sascha Bieletzki, Bönen (DE)

(73) Assignee: GEA Farm Technologies, GmbH, Bönen (DE)

( * ) Notice: Subject to any disclaimer, the term of this patent is extended or adjusted under 35 U.S.C. 154(b) by 359 days.

(21) Appl. No.: 16/092,475

(22) PCT Filed: Apr. 7, 2017

(86) PCT No.: PCT/EP2017/058431
§ 371 (c)(1),
(2) Date: Oct. 10, 2018

(87) PCT Pub. No.: WO2017/182297
PCT Pub. Date: Oct. 26, 2017

(65) Prior Publication Data
US 2019/0159421 A1   May 30, 2019

(30) Foreign Application Priority Data

Apr. 18, 2016   (DE) .................... 10 2016 107 166.8
Jul. 11, 2016   (DE) .................... 10 2016 112 692.6

(51) Int. Cl.
*A01J 7/02*   (2006.01)
*A01J 5/007*   (2006.01)

(52) U.S. Cl.
CPC .............. *A01J 7/022* (2013.01); *A01J 5/007* (2013.01)

(58) Field of Classification Search
CPC .... A01J 7/025; A01J 7/02; A01J 7/022; A01J 7/027; A01J 5/007
(Continued)

(56) References Cited

U.S. PATENT DOCUMENTS

| 4,476,808 A | * | 10/1984 | Meermoller | ............ | A01J 7/022 119/14.18 |
| 6,267,077 B1 | * | 7/2001 | van den Berg | ......... | A01J 7/025 119/14.01 |
| 2010/0126420 A1 | * | 5/2010 | Harty, Jr. | ................ | A01J 7/022 119/14.02 |

FOREIGN PATENT DOCUMENTS

| DE | 283081 A5 | 10/1990 |
| GB | 2475249 A | 5/2011 |

(Continued)

OTHER PUBLICATIONS

International Search Report for PCT/EP2017/058431, dated Jun. 14, 2017, 2 pages.
German Search Report for DE 102016112692.6, 1 page.

*Primary Examiner* — Yvonne R Abbott-Lewis
(74) *Attorney, Agent, or Firm* — Smith Law Office; Jeffry W. Smith (57) ABSTRACT

A method and a device for determining parameters of a rinsing process for a milking system, wherein a rinsing fluid circulates in a circuit to be rinsed in the rinsing process by filling a storage container with a fluid up to a predefined filling level; circulating the fluid from the storage container, via the circuit to be rinsed and back into the storage container; refilling the storage container during the circulation of the fluid up to the predefined filling level, determining a necessary fluid volume; and determining parameters of a subsequent rinsing process based on the determined fluid volume.

10 Claims, 6 Drawing Sheets

(58) Field of Classification Search
USPC .................. 119/14.08, 14.18; 134/169 C
See application file for complete search history.

(56) References Cited

FOREIGN PATENT DOCUMENTS

WO    2010/142601        12/2010
WO    2017/182297 A1    10/2017

* cited by examiner

METHOD AND DEVICE FOR DETERMINING PARAMETERS OF A RINSING PROCESS FOR A MILKING SYSTEM

CROSS REFERENCE TO RELATED APPLICATION

This application is a national phase application under 35 U.S.C. 371 of PCT Application No. PCT/EP2017/058431, filed Apr. 7, 2017, the disclosure of which is incorporated by reference herein.

FIELD AND BACKGROUND OF THE INVENTION

The invention relates to a method for determining parameters of a rinsing process for a milking system, wherein, in the rinsing process, a rinsing liquid is circulated and flushed in milk lines of the milking system. The invention furthermore relates to a device, using which the method can be carried out.

Milking systems are regularly rinsed to remove milk residues and, if necessary, other contaminants. For this purpose, a storage tank for rinsing liquid is provided, from which a rinsing line leads to the individual components of the milking system. Branches of the rinsing lines lead to the individual teat cups of the milking system, which are brought into a special cleaning position for this purpose. In the cleaning process, the rinsing liquid is conveyed through the teat cups and all of the milk lines connecting thereto, including interposed valves, wherein a circuit is provided at least for a certain time, so that the rinsing liquid circulates through the system made up of storage tanks, rinsing lines and milk lines multiple times. Subsequently, the rinsing agent is flushed from the system, if necessary in turn with multiple circulation.

The storage tank can in this case be provided expressly for the rinsing liquid. In an alternative embodiment, it is known that a milk collecting tank—in which during operation of the milking system, the milked milk is collected and pre-cooled and filtered in a cooling and filtering circuit—is additionally used as a storage tank for the rinsing liquid. In such a layout of the milking system, to circulate the rinsing agent through the milking lines of the milking parlors, the cooling and filtering circuit is also additionally cleaned, starting from the storage tank, by circulating and flushing the rinsing agent.

The sequence of the cleaning process can be configured by means of a plurality of parameters. These parameters relate to times, for which certain valves are opened and closed, so that certain liquid quantities flow into the system, circulate in the system and are drained from the system. An important fundamental system variable in this case, from which a multiplicity of the parameters mentioned can be derived, is the volume of the rinsing liquid, which is located in the system to be cleaned, including the rinsing lines, during the circulation. This volume specifies the quantity of rinsing liquid which must be available in the storage tank at least, in order to carry out the circulation without air being sucked into the system to be cleaned. Ideally, the storage tank can accommodate this volume. Possibly, the storage tank is smaller. In this configuration, missing rinsing liquid is added during the cleaning process.

In large milking systems, for example milking carousels with several 10s to 100s of milking parlors, several 100 liters of rinsing liquid are required in the cleaning process. If too much rinsing liquid is provided regularly, this leads to an enormous excess consumption of water and rinsing agent, which is added to the rinsing liquid, which is disadvantageous from a financial and ecological viewpoint. Too little rinsing liquid, by comparison leads to a rinsing result which is unsatisfactory and unacceptable for reasons of hygiene. To some extent, rinsing steps of the rinsing process are also carried out at an increased temperature of the rinsing liquid. Too great a quantity of rinsing liquid is therefore additionally disadvantageous with regards to an unnecessarily high energy consumption of the rinsing process.

SUMMARY OF THE INVENTION

The present invention provides a method, using which a required ideal quantity of rinsing liquid for the rinsing process of the milking system can be determined automatically and reliably, in order to optimally set parameters of the rinsing process. The invention is also directed to a device for carrying out the method.

A method according to the invention of the type mentioned at the beginning has the following steps: A storage tank for rinsing liquid is filled up to a predefined fill level with a liquid, for example water. Next, the liquid is circulated through the circuit to be rinsed, e.g. a milking circuit and/or a cooling circuit of a milking system. During the circulation, the storage tank is refilled up to the predefined fill level, wherein the liquid volume required for that is determined. Parameters of a subsequent rinsing process are determined from the determined liquid volume.

During the methods, part of the rinsing process is simulated, in that liquid is circulated in the circuit to be rinsed. During the circulation, the fill level in the storage tank falls due to the liquid volume circulating in the circuit to be rinsed. By filling the storage tank up to the fill level present before the start of the circulation and measuring the liquid volume taken in, it is possible to determine the liquid volume circulating in the circuit to be rinsed. The method makes it possible to determine the volume in the system to be rinsed using just one fill-level sensor and a water quantity sensor, for example a flow sensor. If an inflow rate of the liquid into the storage tank (filling rate) is known, the liquid quantity to be refilled can even be determined on the basis of the inflow time, which is required until the liquid has reached the predefined upper fill level again. In this case, a single sensor in the system, namely the fill-level sensor which signals when the predefined fill level is reached, is sufficient. Thus, a switch coupled with a float ("float switch") may be used as fill-level sensor. A sensor of this type is already often provided as standard as an overflow sensor in storage tanks of rinsing liquids for milking systems, so that the described method can be implemented without structural changes to the rinsing equipment being necessary.

In this case, the filling rate can be determined in that a total filling time is determined, which is required in order to fill an empty storage tank up to the predefined fill level. Assuming that in the total filling time, a volume is filled which corresponds to the total volume of the storage tank, the filling rate can be calculated from the total volume and the total filling time. If the total volume is known, then it is likewise possible, using only one float switch as fill-level sensor, to determine the filling rate and subsequently the volume of the circuit to be rinsed.

In an advantageous embodiment, the method has the following further steps, which are executed after the refilling of the storage tank, while liquid flows into the circuit to be rinsed. A portion of the liquid is drained from the circuit to be rinsed for a predetermined time, i.e. discarded after passing through the circuit and not conveyed back into the storage tank. The volume thus removed from the storage tank is refilled, while liquid otherwise continues to circulate or stands in the circuit. Filling takes place in turn up to the predefined fill level, wherein a liquid volume required for that is determined. A flow rate of the circuit to be rinsed is determined from the determined liquid volume and the predetermined time. The parameters of the subsequent rinsing process are then determined on the basis of the determined liquid volume of the circuit to be rinsed and the determined flow rate. The flow rate is likewise an important system variable, which has an influence on the parameters of the rinsing process. It can likewise advantageously be determined automatically by means of the described method, wherein in turn only the fill-level sensor is required. In the case of a known inflow rate of the liquid, the volume of the liquid required for calculation can in turn be determined from the filling time, as a result of which the flow rate can also be determined using a float switch as fill-level sensor.

The described method can be carried out with cold water as the liquid. As the filling and flow rates for hot water (and analogously using hot liquid) may differ from those for cold water, in an advantageous embodiment, the determination of the flow rate in particular is additionally carried out using hot water as the liquid. In this case, a heating time can preferably additionally be determined, which heating time is required during the circulation of the liquid, until components of the circuit to be rinsed have reached a predetermined temperature. The heating time can advantageously be taken into account during the determination of the parameters of the following rinsing process, for example in that waiting times are adapted such that during rinsing with hot water, all of the components to be rinsed are also heated such that they are effectively also rinsed using the hot rinsing liquid.

A device according to the invention stands out due to a control device, which is set up for carrying out the previously mentioned method. The advantages mentioned in connection with the method result. The control device is preferably the same device which also controls the sequence of the rinsing process.

BRIEF DESCRIPTION OF THE DRAWINGS

In the following, the invention is described in more detail on the basis of exemplary embodiments with the aid of figures. In the figures.

DETAILED DESCRIPTION OF THE DRAWINGS

Figure 1A:
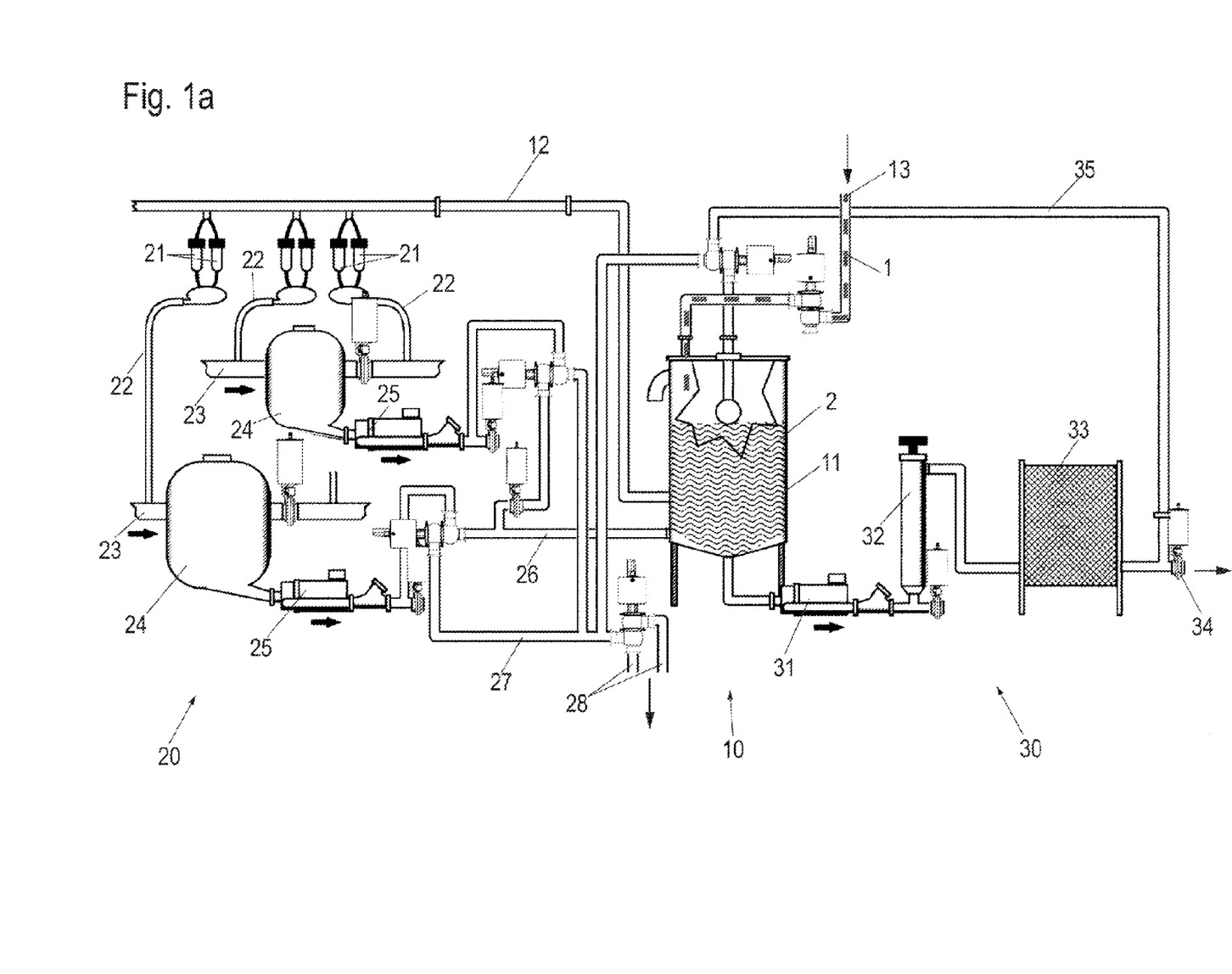
FIGS. 1a-1c in each case show a schematic illustration of a milking system with a rinsing device in various stages of a rinsing process.
Figure 1B:
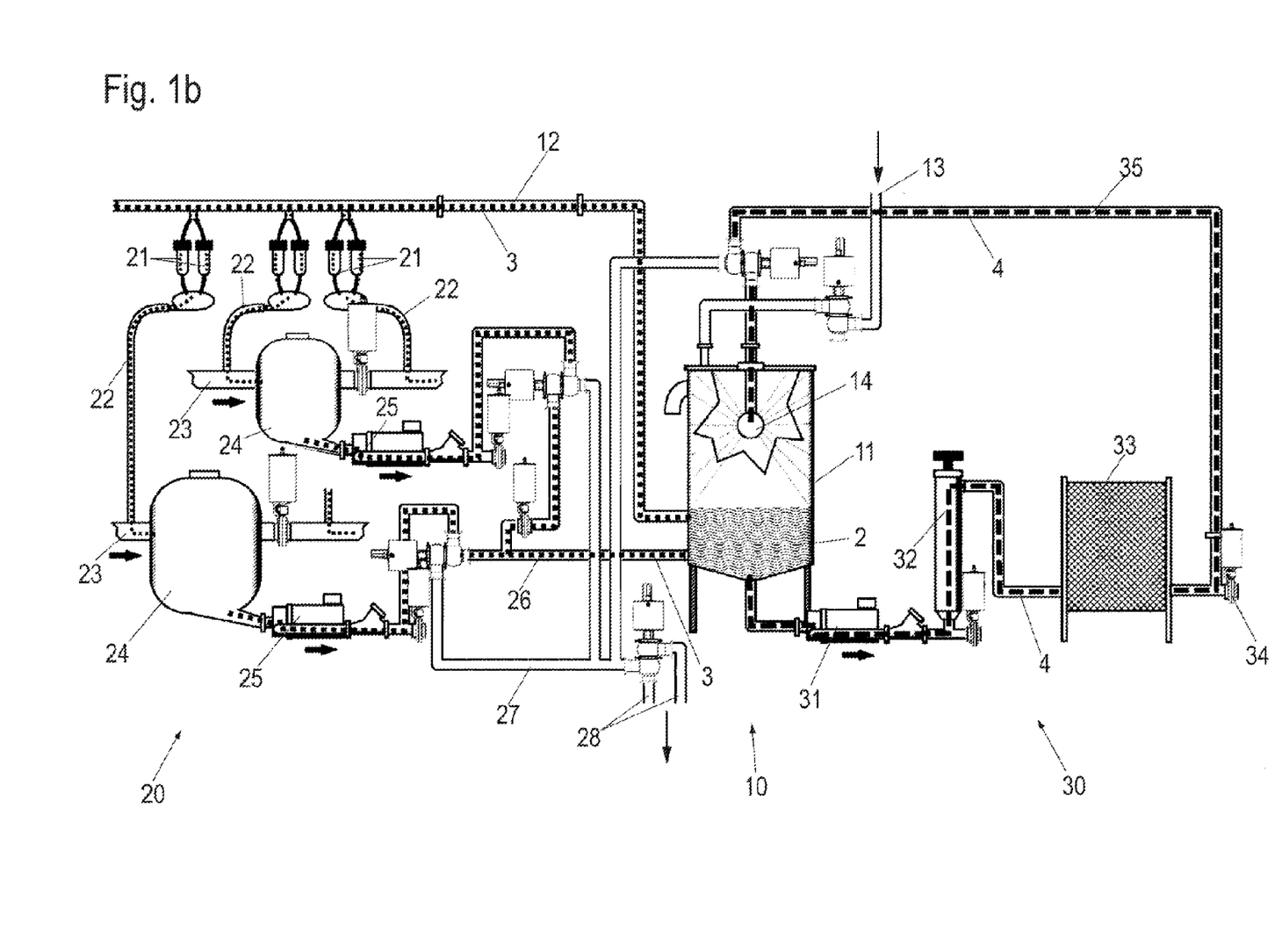
Figure 1C:
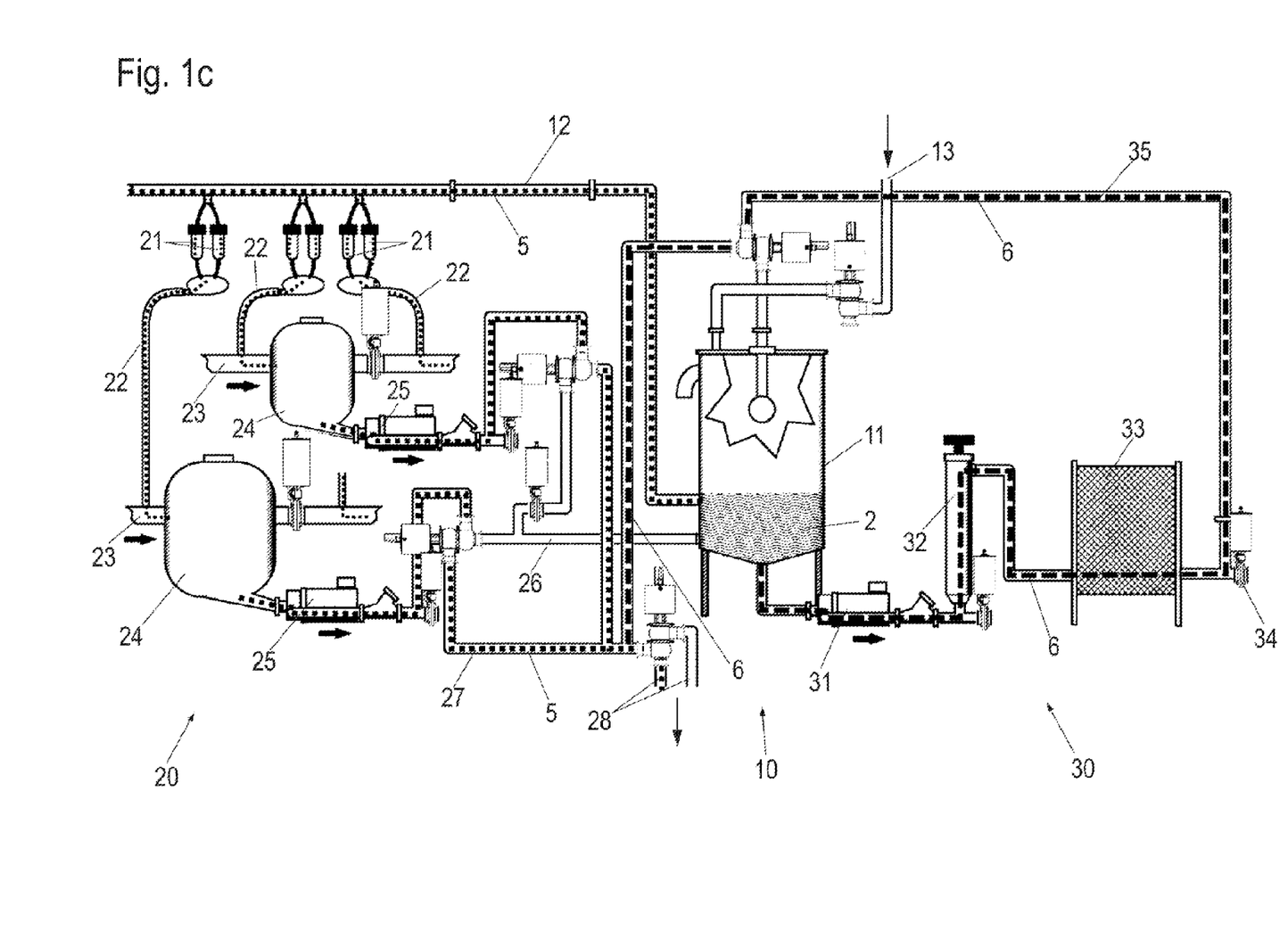

FIGS. 1a to 1c in each case reproduce a milking system in a schematic illustration. Each of the figures shows the milking system in various stages of a rinsing process for cleaning lines and components of milk residues.

The milking system comprises a rinsing device 10 with a storage tank 11 in which rinsing liquid 2 is provided. The rinsing liquid is used in order to clean two liquid circuits, a milking circuit 20 and a cooling circuit 30. The storage tank 11 for the rinsing liquid is used, during milking operation illustrated in the exemplary embodiment, as a buffer tank inside the cooling circuit 30, wherein the cooling circuit 30 is used to pre-cool the milked milk. The method according to the invention for determining and setting parameters of the rinsing process, which is described in the following, can be carried out using a storage tank 11 of this type, which is part of the cooling circuit 30. The method can however likewise be carried out using a storage tank which is specifically installed for the rinsing process in the milking system.

Both the milking circuit 20 and the cooling circuit 30 of the milking system are only sketched schematically in FIGS. 1a to 1c. For reasons of clarity, not all of the illustrated components are provided with reference numbers. This relates in particular to valves, which are used for controlling the milking process and also the cleaning process.

The milking circuit 20 has a plurality of teat cups 21, of which only three sets of teat cups 21 are illustrated in the present document. The teat cups 21 are coupled to milk collection lines 23 by means of milk lines 22. In the milking process, the milking process is carried out by applying a vacuum to the milk collection lines 23. The milk collection line 23 usually runs along a plurality of milking parlors. In a milking system which is constructed as a milking carousel, the milk collection line 23 is usually configured as a ring line, which is subdivided into a plurality of segments, wherein a milk vapor-liquid separator 24, in which the milk obtained is collected, is assigned to each segment. From there, the milk is pumped away by means of milk pumps 25, wherein a downstream-connected valve arrangement enables a differentiation between milk to be used and milk to be discarded. The milk to be used is conveyed via a return line 26 into the storage tank 11, which constitutes the milk storage tank during milking operation. The milk to be discarded is guided via a drainage line 27 into an outflow 28.

The milking circuit 20 is connected to the cooling circuit 30 by means of the storage tank 11. During milking operation, the milk collected in the storage tank 11 is cooled by means of the cooling circuit 30 and transported to a milk tank. A cooling circuit pump 31 is provided for this purpose in the cooling circuit 30, which pumps the milk through a milk filter 32 and a cooler 33. From the cooler 33, the milk is pumped via a valve arrangement through an outflow 34, to the milk tank which is not illustrated here.

FIGS. 1a to 1c show the milking system not during milking operation, but rather during the rinsing process, which is used for cleaning the milking system of milk residues. For this purpose, the storage tank 11 is connected via a corresponding valve arrangement to a water supply 13. There is the option, by means of the water supply 13, to fill the storage tank 11 with cold and/or hot water, if appropriate already mixed with rinsing agents. This filling process of the storage tank 11 is illustrated in FIG. 1a. Starting from the supply 13, supplied liquid 1 is illustrated by means of a dashed line in the lines between the supply and the storage tank 11. Liquid 2 correspondingly accumulates in the storage tank 11.

FIG. 1b illustrates a stage of the rinsing process, in which the liquid 2 from the storage tank 11 continuously circulates through the milking circuit 20 and the cooling circuit 30. Liquid 3 circulating in the milking circuit 20 is symbolized by a dotted line. Liquid 4 circulating in the cooling circuit 30 is illustrated by a dashed line.

A rinsing line 12, which runs from the storage tank 11 and leads to each milking parlor, is provided for circulating the liquid 3 in the milking circuit 20. The rinsing line 12 has outflows, which lead to the individual teat cups 21 in a vacuum-tight manner. Usually, a special cleaning position is provided for the teat cups 21 at each milking parlor for this purpose, wherein the hydraulic connection between the rinsing line 12 and the teat cups 21 and therefore the milk lines 22 is formed in this cleaning position.

The liquid 3 in the milking circuit 20 takes the path starting from the rinsing line 12, which the milk to be recovered has taken to the storage tank 11 during the milking process. Accordingly, all components which have come into contact with this part of the milk are rinsed. Like the milk previously conveyed through the cooling circuit 30, the liquid 4 circulating in the cooling circuit 30 is pumped by the cooling circuit pump 31, via the milk filter 32 and the cooler 33, through the return line 35, back into the storage tank 11. The outlet of the return line 35 in the storage tank 11 is constructed as a so-called "sprayball" 14, a ball with holes, which are arranged in a distributed manner on the surface of the ball. The liquid 4 is therefore sprayed in the upper region of the storage tank 11, in order to also clean the walls thereof and the cover thereof.

FIG. 1c finally shows a stage of the rinsing process, in which liquid 5 or 6 is not circulated in the milking circuit 20 or cooling circuit 30 and returned back to the storage tank 11, but rather is conveyed to the outflow 28 by means of a corresponding valve position. In this manner, the liquid 2 in the storage tank 11 is drained and the lines of the milking circuit 20, through which the previously discarded milk was drained, are also cleaned.

The illustrated rinsing process of both the milking circuit 20 and the cooling circuit 30 usually takes place in three successive phases, a clear rinsing phase, in which the milk residues are initially flushed, a main rinsing phase, in which warm water, if appropriate with chemical cleaning additives added, circulates in the milking circuit 20 and the cooling circuit 30 and is subsequently drained, and a further clear rinsing phase, in which residues of the cleaning agent are flushed.

As can be seen from FIGS. 1a to 1c, the outlet for the cooling circuit 30 is arranged on the storage tank 11 at the deepest point thereof, in order to also be able to drain all milk collected during milking operation from the storage tank 11. By contrast, the connection for the rinsing line 12 is arranged above the deepest point. If liquid 3 should circulate through the milking circuit 2, the level of the liquid 2 in the storage tank must not drop below the height of the connection of the rinsing line 12. The quantity of liquid 2 admitted into the storage tank 11 at the beginning (cf. FIG. 1a) is to be chosen to be of such a size that the liquid level of the liquid 2 maintains a satisfactory height during the circulation of the liquids 3 and 4.

However, how far the liquid 2 drops is dependent on the volume of the milking circuit 20 and, if appropriate, the cooling circuit 30. If too great a quantity of liquid 2 is admitted into the storage tank 11, then this causes increased consumption of liquid and, if appropriate, cleaning agents and energy for heating the liquid during the rinsing process.

The method for setting parameters of the rinsing process, described in the following in connection with FIGS. 2 and 3a to 3e, optimizes the liquid quantity used.

Figure 2:
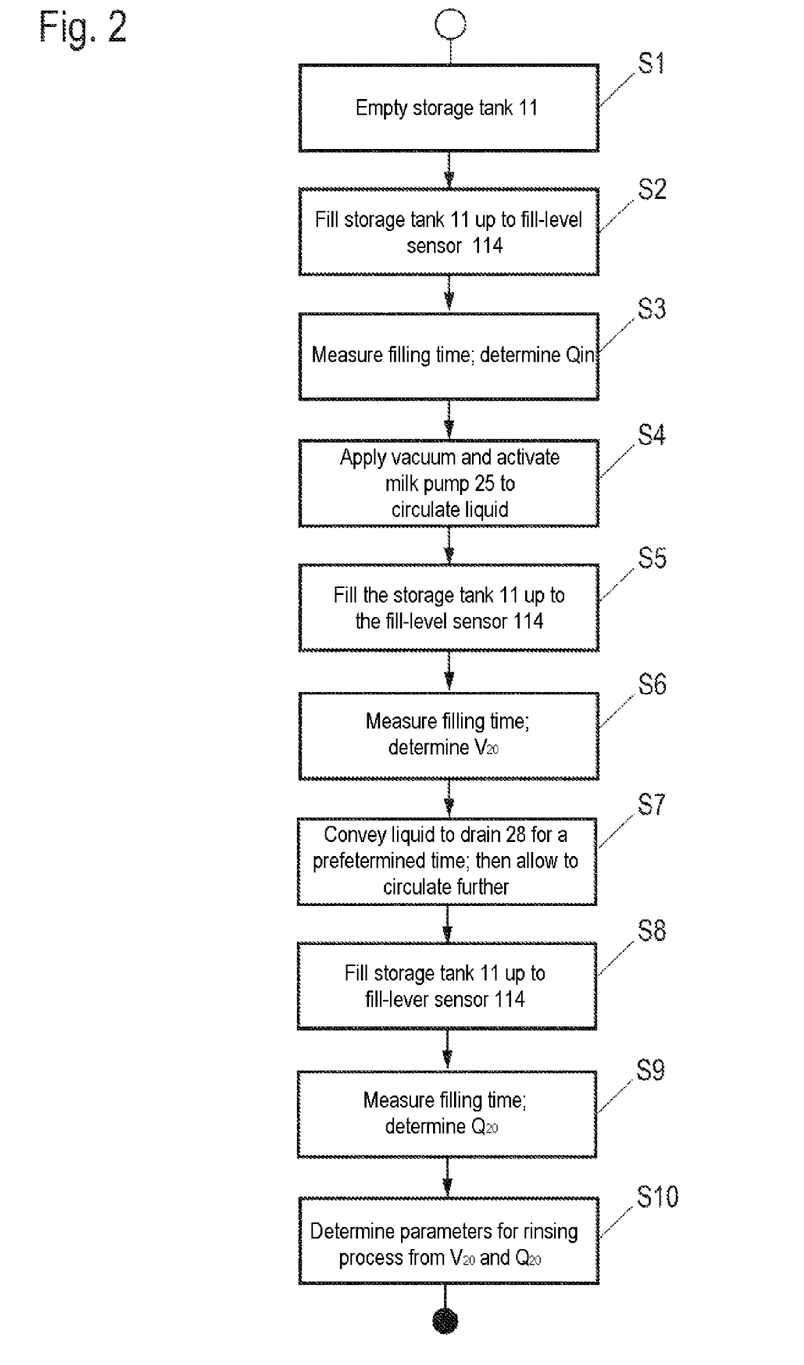
FIG. 2 shows a flow chart of a method according to the application for setting parameters of a rinsing process.

FIG. 2 shows an exemplary embodiment of the method in a flow chart. Various stages which are assumed in the course of the method, are illustrated schematically in the FIGS. 3a to 3e, to which reference is made in the description of the flow chart of FIG. 2. The method shown can for example be carried out in connection with the milking system according to FIGS. 1a to 1c. It is likewise conceivable to carry out the method in a rinsing device 10, the storage tank 11 of which is designed exclusively for the purpose of rinsing a milking circuit 20.

Figure 3A:
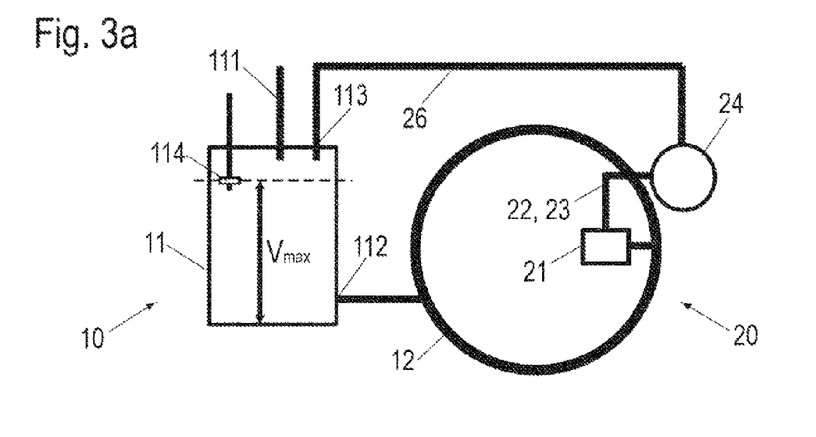
FIGS. 3a to 3e in each case show a schematic illustration of a method for determining parameters of a rinsing process at various stages.

In a first step S1, the storage tank 11 and all further system parts are emptied. The state then assumed is illustrated in FIG. 3a. The storage tank 11 shown there has a liquid inlet 111, via which liquid can be supplied. Furthermore, an outlet 112 is present, which merges into a rinsing line 12, from which the milking circuit 20 can be rinsed. The teat cups 21 of milking equipment with milk line 22 or milk collection line 23 and milk vapor-liquid separator 24 are illustrated by way of example. A return line 26 runs from the milk vapor-liquid separators 24 back to a return connection 113 of the storage tank 11.

Furthermore, a fill-level sensor 114 is arranged in the storage tank 11, which is constructed as a float switch and thus detects a fill level when it lies in the region of the switching point of the float switch. For the following, it is assumed that it is possible to manually change the position of the fill-level sensor 114, particularly the height at which it is arranged.

Figure 3B:
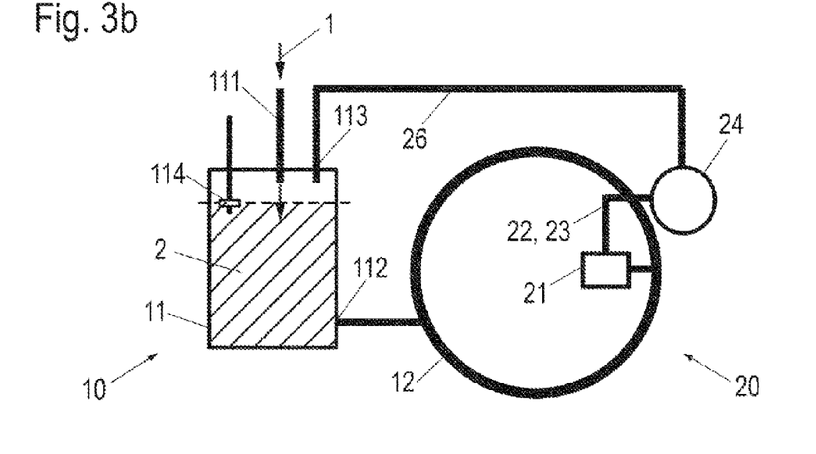

In a next step S2, the storage tank 11 is filled, in that liquid, preferably initially cold water, is admitted into the storage tank 11 via the inlet 111. The fill-level sensor 114 is arranged as high as possible for this process, so that, as far as possible, the fill-level sensor 114 only triggers if the storage tank 11 is completely filled with liquid or filled with liquid up to a height just below an overflow. This state is illustrated in FIG. 3b.

In this case, during the filling of the storage tank 11, the time that the filling requires is measured. Using this measured time and a known volume $V_{max}$ of the storage tank 11, a filling rate $Q_{in}$ of the liquid when flowing into the storage tank 11 is determined in a step S3. The filling rate $Q_{in}$ specifies the liquid quantity that flows in per unit time. If the filling rate $Q_{in}$ is otherwise known by the design configuration of the system, for example by means of a flow rate limiter or a flow rate gauge, it is possible to dispense with the measurement and calculation of the filling rate $Q_{in}$ in step S3.

In a step S4, starting from the completely filled storage tank 11, the circulation of the liquid 2 through the milking circuit 20 is started. This takes place by means of the application of a vacuum on the milk collection line 23 and the operation of the milk pumps 25 (cf. FIGS. 1a-1c), which pump the liquid out of the milk vapor-liquid separators 24 back to the storage tank 11. For example, the milk pumps 25 can be started as soon as a certain liquid level has been reached in the milk vapor-liquid separators 24 and stopped, preferably with a certain follow-up time, as soon as a minimum fill level has been reached or fallen below in the milk vapor-liquid separators 24.

Figure 3C:
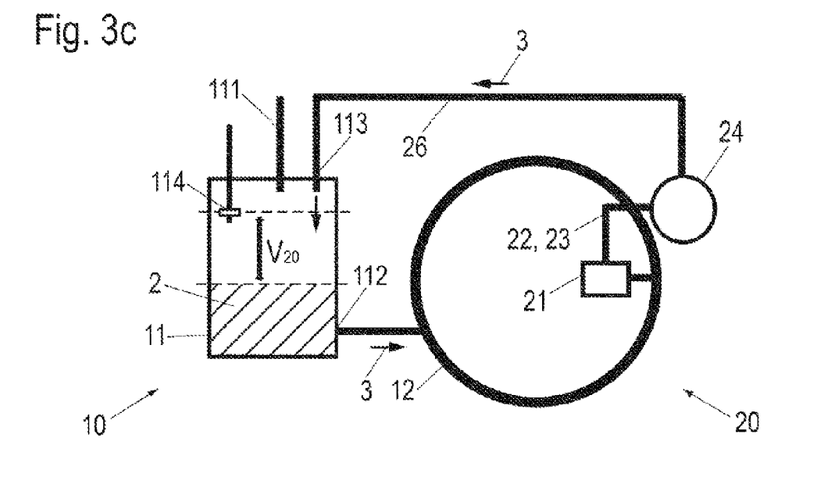
Figure 3D:
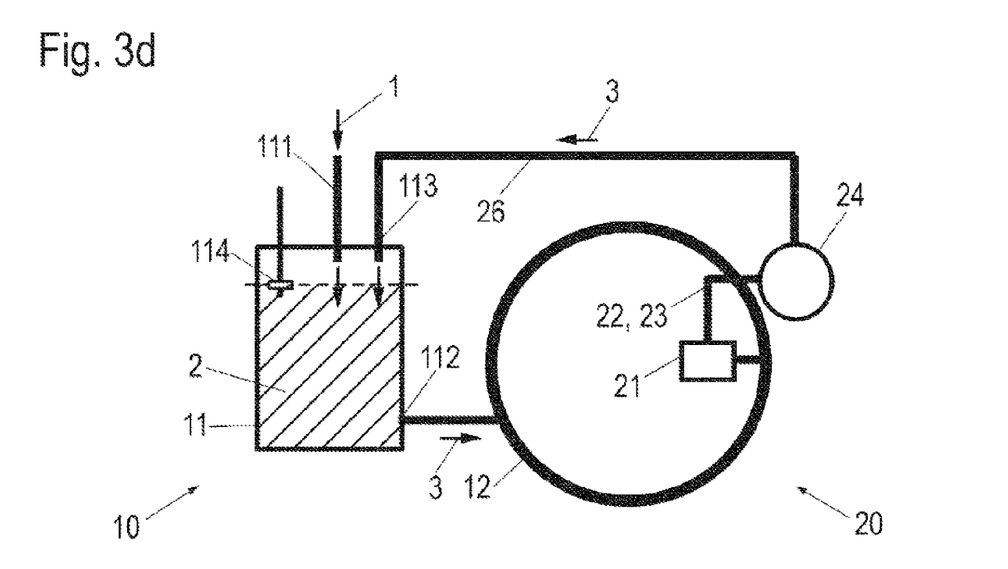

If this circulation process runs for a minimum time, so that the milking circuit 20 is filled completely, the liquid level of the liquid 2 in the storage tank 11 has dropped, as is illustrated in FIG. 3c. The volume $V_{20}$ remaining up to the fill level according to FIG. 3b corresponds to the volume (the quantity) of the liquid circulating in the milking circuit 20. This is determined in that in a step S5, the storage tank 11 is in turn filled in a step S5 until the fill-level sensor 114 responds and the filling time required for that is measured. Filling in the case of a circulating liquid is illustrated in FIG. 3d. In a step S6, the volume $V_{20}$ is determined using the measured filling time and the filling rate $Q_{in}$ known from step S3.

Figure 3E:
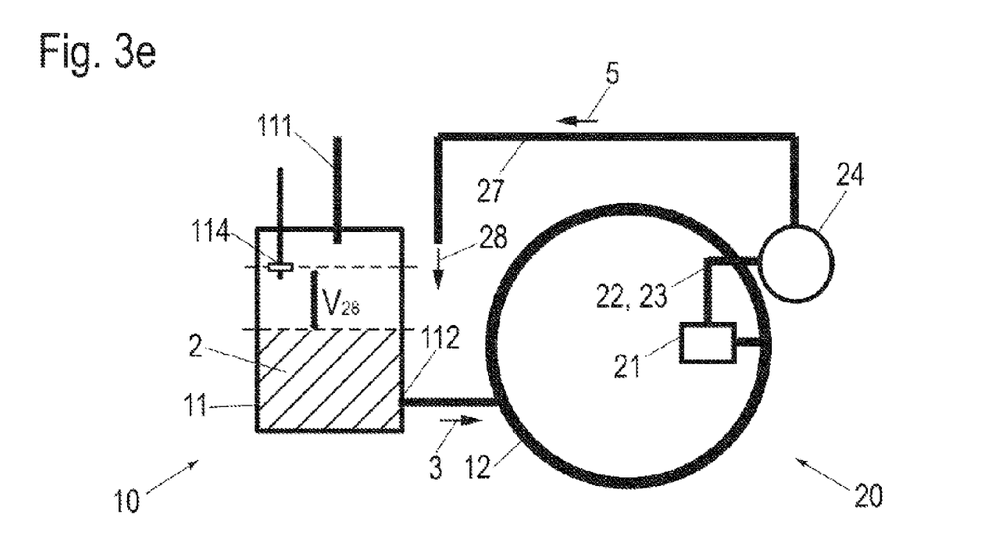

Subsequently, in a step S7, liquid is sucked with applied vacuum from the storage tank 11 into the milking circuit 20 for a predetermined time, however not pumped back into the storage tank 11, but rather drained from the milking circuit 20. Accordingly, as illustrated in FIG. 3e, the liquid level falls to a certain value, which specifies the liquid volume which could be drained in the predetermined time.

In a following step S8, a switch is made in turn to the circulation mode, so that liquid is conveyed further through the milking circuit 20. In step S8, the drained quantity is added again in that the storage container 11 is filled again and the time required for that is measured. Thus, in step S9, the volume drained in step S6, can be determined. With knowledge of the time which was required in order to drain this volume in step S6, a flow rate $Q_{20}$ can be determined, with which the liquid flows from the storage tank 11 via the rinsing line 12 into the milking circuit 20.

The flow rate $Q_{20}$ in the milking circuit 20 is likewise an important parameter, which is used in the present example in addition to the volume $V_{20}$ of the milking circuit 20 in a subsequent step S10 for setting the parameters of the rinsing process. The rinsing process may follow.

Optionally, further system properties can be determined. In an additional step, the steps S1 to S3 can for example be repeated, wherein in this case not cold water, but rather hot water is admitted. The filling rates for hot-water filling of the storage tank 11 can thus be determined. In a further step, drainage of hot water out of the milking circuit 20 can take place, wherein an optional temperature sensor, which is arranged on the return line 26 for example, gives information about the time after which the milking circuit 20 is heated by the hot rinsing liquid. This parameter is also relevant for the procedure of the rinsing process, as it influences certain waiting times of the rinsing process. In addition, the flow rate of hot rinsing liquid can be determined analogously to the steps S7 to S9. Alternatively, it can be assumed that the flow rate for hot rinsing liquid is the same as the flow rate of the cold rinsing liquid.

Finally, the measurements according to steps S4 to S6 can be carried out anew, but this time not for a circulation of the liquid in the milking circuit 20, but rather for a circulation of the liquid in the cooling circuit 30. Alternatively, the volume of the cooling circuit 30 can also be predetermined or estimated, as it is usually considerably smaller than the volume of the milking circuit 20 and the influence thereof is negligible.

As mentioned at the beginning, it makes sense at the start of the rinsing process to provide only one liquid quantity in the storage tank 11, which is sufficient to stop the outlet 112, to which the rinsing line 12 is connected, from running dry during the rinsing process. If the geometry of the storage tank 11 is known, it is then possible to calculate how high the fill level in the storage tank 11 should optimally be at the start of a rinsing process from the determined volumes $V_{20}$ of the milking circuit 20, plus, if appropriate, the estimated or determined volume of the cooling circuit 30 and a safety margin. This calculated height information can be output in the method, whereupon the fill-level sensor 114 is set by hand such that it triggers at this desired fill height. In following rinsing processes, liquid 2 for the rinsing process is then filled up in each case to the triggering of the fill-level sensor 114.

Using the described method, a complete and substantially automated setting of all parameters for the rinsing process can take place, wherein only a single sensor, in the present case a float switch, is required as fill-level sensor 114.

If a fill-level sensor is used instead of the float switch, which outputs an analogous or continuous value for the fill level, it is possible to dispense with the determination of the filling rates in steps S1 to S3. Also, a manual adaptation of the switching point of the fill-level sensor 114 is not required. The method can be controlled electronically such that the desired fill height is in each case reached at the start of a rinsing process or a new section of a rinsing process.

The invention claimed is:

1. A method for determining parameters of a rinsing process for a milking system, wherein, in the rinsing process, a rinsing liquid circulates in a circuit to be rinsed, the method comprising the steps of:
   filling a storage tank for rinsing liquid up to a predefined fill level with a liquid;
   circulating the liquid from the storage tank through the circuit to be rinsed and back into the storage tank;
   refilling the storage tank during the circulation of the liquid up to the predefined fill level;
   determining a liquid volume required for refilling the storage tank; and
   determining a parameter of a subsequent rinsing process on the basis of the determined liquid volume.

2. The method of claim 1, and further comprising the step of:
   measuring a time required for refilling the storage tank, and the liquid volume is determined from the required time and a known filling rate.

3. The method of claim 1, and further comprising the steps of:
   determining a filling rate; and
   determining a total filling time required to fill the storage tank up to the predefined fill level, and wherein the volume filled in the total filling time is assumed to be equal to the total volume of the storage tank.

4. The method of claim 1, and, after performing the step of refilling of the storage tank while liquid flows into the circuit to be rinsed, the method further comprises the steps of:
   draining a portion of the liquid from the circuit to be rinsed for a predetermined time;
   determining a flow rate through the circuit to be rinsed on the basis of the determined liquid volume and a predetermined time; and
   determining the parameter of a subsequent rinsing process on the basis of the previously determined liquid volume and the determined flow rate.

5. The method of claim 1, in which the circuit to be rinsed is a milking circuit of the milking system.

6. The method as claimed of claim 1, in which the circuit to be rinsed is a cooling circuit of the milking system.

7. The method of claim 1, in which the liquid comprises water.

8. The method of claim 1, and further comprising the steps of:
   heating the liquid; and
   determining a heating time required until a component of the circuit to be rinsed has reached a predetermined temperature, wherein the parameter of the subsequent rinsing process is determined on the basis of the heating time.

9. A device for determining a parameter of a rinsing process for a milking system, wherein, in the rinsing process, a rinsing liquid circulates in a circuit to be rinsed, and the device comprises a control device to perform the steps of:
   filling a storage tank for rinsing liquid up to a predefined fill level with a liquid;
   circulating the liquid from the storage tank through the circuit to be rinsed and back into the storage tank;

refilling the storage tank during the circulation of the liquid up to the predefined fill level;

determining a liquid volume required for refilling the storage tank; and determining a parameter of a subsequent rinsing process on the basis of the determined liquid volume.

10. The device of claim 9, in which the control device further controls a rinsing process.

* * * * *